US008379805B2

(12) United States Patent
Van Doorselaer et al.

(10) Patent No.: US 8,379,805 B2
(45) Date of Patent: Feb. 19, 2013

(54) INTERACTIVE RESPONSE SYSTEM FOR GIVING A USER ACCESS TO INFORMATION

(75) Inventors: Bart Alfons Peter Van Doorselaer, Merelbeke (BE); Toon Coppens, Lier (BE); Geert Arthur Edith Van Wonterghem, Eeklo (BE); Bart Karel Hemmeryckx-Deleersnijder, Heverlee (BE)

(73) Assignee: Alcatel Lucent, Paris (FR)

( * ) Notice: Subject to any disclaimer, the term of this patent is extended or adjusted under 35 U.S.C. 154(b) by 1259 days.

(21) Appl. No.: 11/613,347

(22) Filed: Dec. 20, 2006

(65) Prior Publication Data
US 2007/0165793 A1 Jul. 19, 2007

(30) Foreign Application Priority Data
Dec. 23, 2005 (EP) .................................. 05292810

(51) Int. Cl.
*H04M 11/00* (2006.01)
(52) U.S. Cl. .................................. 379/88.13; 379/93.12
(58) Field of Classification Search ............... 379/93.12, 379/265.01–266.1, 88.13
See application file for complete search history.

(56) References Cited

U.S. PATENT DOCUMENTS

| | | | | |
|---|---|---|---|---|
| 5,345,501 A * | 9/1994 | Shelton | ......................... | 379/88.2 |
| 5,914,712 A * | 6/1999 | Sartain et al. | ..................... | 725/9 |
| 6,014,439 A * | 1/2000 | Walker et al. | ............ | 379/266.01 |
| 6,157,829 A * | 12/2000 | Grube et al. | ................ | 455/414.1 |
| 6,226,362 B1 * | 5/2001 | Gerszberg et al. | ......... | 379/88.13 |
| 6,330,327 B1 * | 12/2001 | Lee et al. | ..................... | 379/266.1 |
| 6,370,137 B1 * | 4/2002 | Lund | ............. | 370/352 |
| 6,587,138 B1 * | 7/2003 | Vogt et al. | .................. | 348/14.12 |
| 6,771,639 B1 * | 8/2004 | Holden | ......................... | 370/352 |
| 7,336,779 B2 * | 2/2008 | Boyer et al. | ............. | 379/265.02 |
| 7,711,095 B2 * | 5/2010 | Erhart et al. | ............... | 379/88.13 |
| 2002/0133824 A1 | 9/2002 | Mensch | | |
| 2004/0088371 A1 | 5/2004 | Hiramatsu | | |
| 2004/0158855 A1 | 8/2004 | Gu | | |
| 2005/0060175 A1 * | 3/2005 | Farber et al. | ....................... | 705/1 |
| 2005/0289130 A1 * | 12/2005 | Cohen et al. | ....................... | 707/3 |

* cited by examiner

*Primary Examiner* — Simon Sing
(74) *Attorney, Agent, or Firm* — Fay Sharpe LLP

(57) ABSTRACT

Interactive response systems (1) of call centers for giving users access to information comprise means (11, 31) for receiving activation signals via audio or video or audio/video calls from the users and means (12, 32) for transmitting menu signals to the users and means (13, 21, 33) for receiving selection signals from the users are provided with means (22, 34) for transmitting video signals to the users for providing video to the user. This video may have entertaining, explaining, supporting and/or commercial functions and makes the interactive response systems more-sided and user friendly. The users either use two different devices (4, 5) or use one device (6) for exchanging audio and for receiving video. The interactive response systems (1) further comprise means (14, 35) for receiving link signals that provide direct or indirect links from the interactive response systems (1) to the devices (5) or to video or audio/video calls with the devices (6). The devices (4-6) comprise means (43, 52, 65) for transmitting selection signals to the interactive response systems (1) for making selections within menus.

22 Claims, 3 Drawing Sheets

INTERACTIVE RESPONSE SYSTEM FOR GIVING A USER ACCESS TO INFORMATION

BACKGROUND OF THE INVENTION

Figure 1:
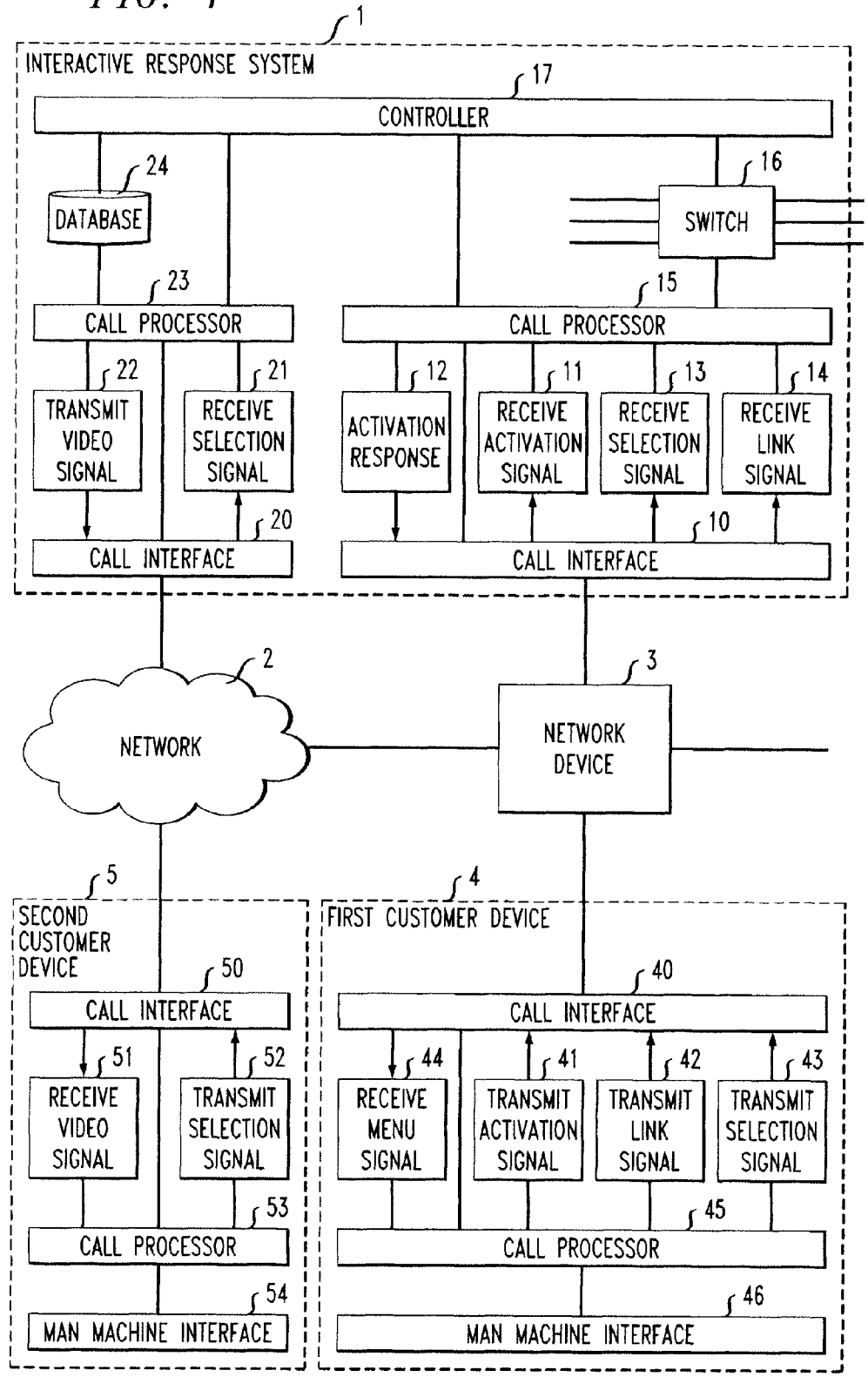

The invention relates to an interactive response system for giving a user access to information and comprising means for receiving an activation signal via a call from the user for in response to a reception of the activation signal activating the interactive response system and comprising means for in response to an activation of the interactive response system transmitting a menu signal to the user for providing a menu to the user and comprising means for receiving a selection signal from the user for in response to a reception of the selection signal making a selection in the menu.

Examples of such an interactive response system are interactive voice response systems, without excluding other interactive response systems.

A prior art interactive response system such as an interactive voice response system is of common general knowledge. The user dials a telephone number via a telephone for contacting a call center comprising an interactive voice response system. In response to the telephone number being dialed, for example an audio call is set up from the telephone to the call center, and an activation signal is supplied to the interactive voice response system. In response to an activation of the interactive voice response system, a menu signal comprising a computer voice is supplied to the telephone for providing a menu to the user ("If you want A, press "1", if you want B, press "2" etc."). The user makes a selection in the menu by pressing a key of the telephone, which results in a selection signal being transmitted to the interactive voice response system. Then, either a next phase within the menu is started or a next menu is started or the user is connected to an employee of the call center.

The known interactive response system is disadvantageous, inter alia, owing to the fact that it is one-sided. This makes the known interactive response system relatively user unfriendly.

SUMMARY

It is an object of the invention, inter alia, to provide an interactive response system as defined above that is not one-sided.

The interactive response system according to the invention is characterized in that the interactive response system comprises means for transmitting a video signal to the user for providing video to the user.

By introducing, in addition to the activation signal receiving means and the menu signal transmitting means and the selection signal receiving means, the video signal transmitting means, video is provided to the user. This video may have an entertaining function and/or an explaining function and/or a supporting function and makes the interactive response system more-sided.

The interactive response system according to the invention is further advantageous, inter alia, in that it is relatively user friendly.

An embodiment of the interactive response system according to the invention is characterized in that the video signal forms part of a further call different from the call, which call comprises an audio call or a video call or an audio/video call and which further call comprises a video call or an audio/video call.

The further call comprises video destined for the user and might further comprise further audio destined for the user.

The use of separate calls is advantageous in that the original call does not need to be changed and can remain as it is, and that the separate calls will get separate bills. The user might be billed for the call and the call center might be billed for the further call, or the user or the call center might be billed for both calls. In case of the video having a commercial function, a (part of a) bill might be paid by the advertiser.

An embodiment of the interactive response system according to the invention is characterized in that a first device at a user location comprises means for transmitting the activation signal to the interactive response system and a second device at the user location comprises means for receiving the video signal, which first and second devices are different devices.

In this case, the first device for example comprises a wired or wireless telephone comprising the activation signal transmitting means, and the second device for example comprises a personal computer comprising the video signal receiving means and connected to a network such as the internet or comprises a television coupled to a set top box comprising the video signal receiving means and connected to a network such as the internet An embodiment of the interactive response system according to the invention is characterized in that the first device comprises means for transmitting a link signal to the interactive response system and the interactive response system comprises means for receiving the link signal for providing a direct or indirect link from the interactive response system to the second device.

The first device comprises the link signal transmitting means and the interactive response system comprises the link signals receiving means. The link signal might provide a direct link to the second device, such as for example an Internet Protocol address or a Uniform Resource Locator or an other unique identifier, to be entered via the first device. Alternatively, the link signal might provide an indirect link to the second device, such as for example a caller identification. In that case, the interactive response system needs to comprise means for converting for example the caller identification into for example the Internet Protocol address or the Uniform Resource Locator or an other unique identifier. Such converting means might comprise a database comprising link information received from users via mail or might comprise a server coupled to a website comprising link information entered by users via website visits. Further alternatively, a service provider might already have the necessary information because the service provider can identify the customers and link them to the services.

An embodiment of the interactive response system according to the invention is characterized in that at least one of the first and second devices comprises means for transmitting the selection signal to the interactive response system.

The selection signal might be generated and transmitted via the first device in a way common in the art and/or might be generated and transmitted via the second device, for example via a mouse or a remote control or a touch screen of the second device. In the first situation, the call will need to be a bidirectional call and the further call might be a uni-directional call. In the latter situation, the call and the further call will need to be bidirectional calls.

An embodiment of the interactive response system according to the invention is characterized in that a device at a user location comprises means for transmitting the activation signal to the interactive response system and comprises means for receiving the video signal.

In this case, the device for example comprises a wired or wireless telephone comprising the activation signal transmitting means and the video signal receiving means, or the device comprises a personal computer comprising the activation signal transmitting means and the video signal receiving means and connected to a network such as the internet or comprises a television coupled to a set top box comprising the activation signal transmitting means and the video signal receiving means and connected to a network such as the internet. The call might be a Voice over Internet Protocol call or a Video over Internet Protocol call or an Audio Video over Internet Protocol call. The further call might be a Video over Internet Protocol call or an Audio Video over Internet Protocol call.

An embodiment of the interactive response system according to the invention is characterized in that the device comprises means for transmitting a link signal to the interactive response system and the interactive response system comprises means for receiving the link signal for providing a direct or indirect link from the interactive response system to the device.

The device comprises the link signal transmitting means and the interactive response system comprises the link signals receiving means. The link signal might provide a direct link to the (further call with the) device, such as for example an Internet Protocol address or a Uniform Resource Locator or an other unique identifier, to be entered via the device via the call. Alternatively, the link signal might provide an indirect link to the (further call with the) device, such as for example a caller identification. In that case, the interactive response system needs to comprise means for converting for example the caller identification into for example the Internet Protocol address or the Uniform Resource Locator or an other unique identifier. Such converting means might comprise a database comprising link information received from users via mail or might comprise a server coupled to a website comprising link information entered by users via website visits. Further alternatively, a service provider might already have the necessary information because the service provider can identify the customers and link them to the services.

An embodiment of the interactive response system according to the invention is characterized in that the device comprises means for transmitting the selection signal to the interactive response system.

The selection signal might be generated and transmitted via the device in a way common in the art via the call and/or might be generated and transmitted via the device, for example via a mouse or a remote control or a touch screen of the second device via the further call. In the first situation, the call will need to be a bidirectional call and the further call might be a unidirectional call. In the latter situation, the call and the further call will need to be bidirectional calls.

The invention also relates to a device for use in combination with the interactive response system according to the invention.

The invention also relates to a method for giving a user access to information via an interactive response system and comprising a first method step of receiving an activation signal via a call from the user for in response to a reception of the activation signal activating the interactive response system and comprising a second method step of in response to an activation of the interactive response system transmitting a menu signal to the user for providing a menu to the user and comprising a third method step of receiving a selection signal from the user for in response to a reception of the selection signal making a selection in the menu.

The method according to the invention is characterized in that the method comprises a fourth method step of transmitting a video signal to the user for providing video to the user.

Embodiments of the method according to the invention correspond with the embodiments of the interactive response system according to the invention.

The invention also relates to a computer program product for performing at least the fourth method step of the method according to the invention.

Such a computer program product according to the invention might further perform one or more of the first and second and third method steps of the method according to the invention.

The invention also relates to a medium comprising the computer program product according to the invention.

The invention is based upon an insight, inter alia, that prior art interactive response systems are one-sided. The invention is based upon a basic idea, inter alia, that in addition video is to be provided to the user.

The invention solves the problem, inter alia, to provide an interactive response system that is not one-sided. The interactive response system according to the invention is further advantageous, inter alia, in that it is relatively user friendly.

These and other aspects of the invention will be apparent from and elucidated with reference to the embodiments(s) described hereinafter.

BRIEF DESCRIPTION OF THE SEVERAL VIEW OF THE DRAWING(S)

Figure 2:
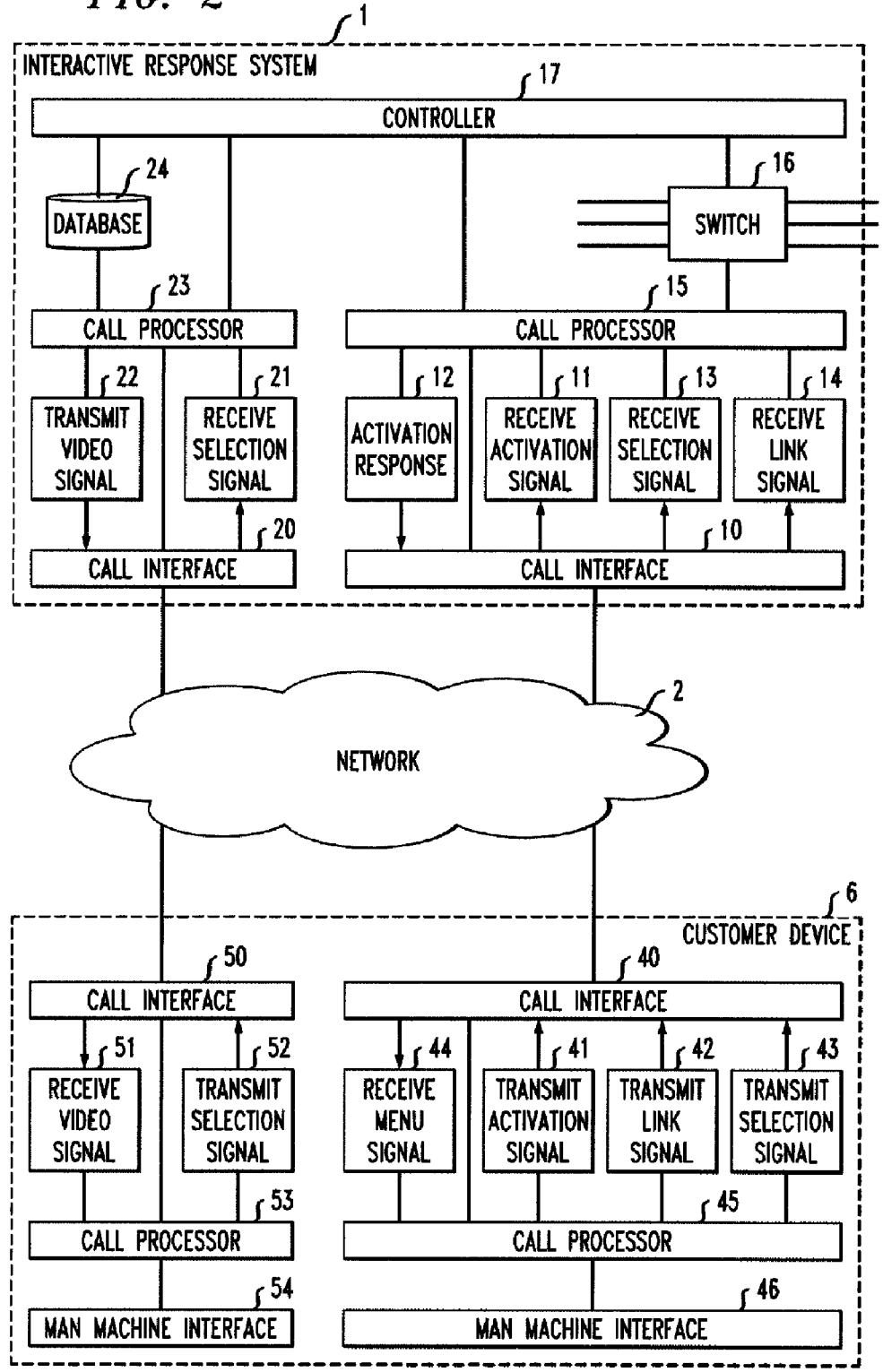
Figure 3:
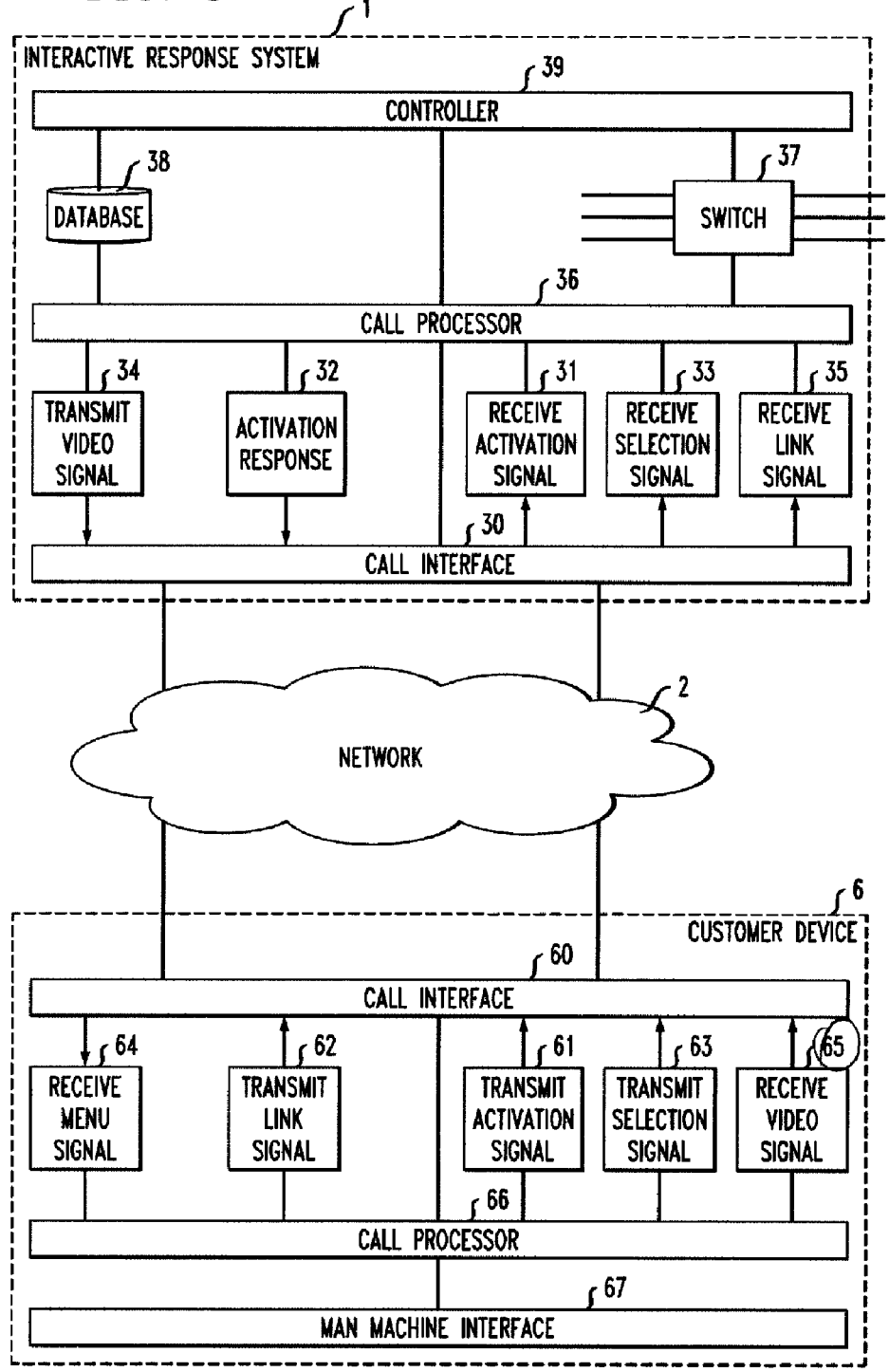

FIG. 1 shows diagrammatically an interactive response system according to the invention comprising separated parts and coupled to two devices according to the invention, FIG. 2 shows diagrammatically an interactive response system according to the invention comprising separated parts and coupled to one device according to the invention comprising separated parts, and FIG. 3 shows diagrammatically an interactive response system according to the invention comprising an integrated part and coupled to one device according to the invention comprising an integrated part.

DETAILED DESCRIPTION OF THE INVENTION

The interactive response system 1 according to the invention shown in FIG. 1 comprises means 11 for receiving an activation signal via a call from a user at a first customer device 4 according to the invention for in response to a reception of the activation signal activating the interactive response system 1 and comprises means 12 for in response to an activation of the interactive response system 1 transmitting a menu signal to the user for providing a menu to the user and comprises means 13 and 21 for receiving a selection signal from the user for in response to a reception of the selection signal making a selection in the menu and comprises means 22 for transmitting a video signal to the user for providing video to the user and comprises means 14 for receiving a link signal for providing a direct or indirect link from the interactive response system 1 to a second customer device 5.

Thereto, the interactive response system 1 further comprises a call interface 10 coupled to a network device 3 such as a switch or a router or a bridge or a multiplexer and coupled to a call processor 15 directly as well as indirectly via the means 11-14. The interactive response system 1 further comprises a further call interface 20 coupled to a network 2 such as the internet and coupled to a further call processor 23 directly as well as indirectly via the means 21, 22. The call processor 15 is coupled to a controller 17 directly as well as indirectly via a switch 16 and the further call processor 23 is coupled to the controller 17 directly as well as indirectly via a database 24. The network device 3 is further coupled to the network 2.

The first device 4 such as a wired or wireless telephone comprises means 41 for transmitting the activation signal to the interactive response system 1 via the network device 3 and comprises means 42 for transmitting the link signal to the interactive response system 1 via the network device 3 and comprises means 43 for transmitting the selection signal to the interactive response system 1 via the network device 3 and comprises means 44 for receiving the menu signal from the interactive response system 1 via the network device 3. Thereto, the first device 4 comprises a call interface 40 coupled to a call processor 45 directly as well as indirectly via the means 41-44, which call processor 45 is further coupled to a man machine interface (mmi) 46 that for example comprises a keyboard, a microphone and/or a loudspeaker.

The second device 5 such as a personal computer or a television and a set top box comprises means 51 for receiving the video signal from the interactive response system 1 via the network 2 and comprises means 52 for transmitting the selection signal to the interactive response system 1 via the network 2. Thereto, the second device 5 comprises a further call interface 50 coupled to a further call processor 53 directly as well as indirectly via the means 51, 52, which further call processor 53 is further coupled to a man machine interface (mmi) 54 that for example comprises a display, a mouse, a keyboard, a touch screen and/or a remote control.

In a prior art situation, in the interactive response system 1 the means 21 and 22 and the further call interface 20 and the further call processor 23 are not present, and the second device 5 is not involved. The interactive response system 1 then acts as an interactive voice response system. A user who wants to get access to information dials a telephone number via the mmi 46 for contacting a call center comprising the interactive voice response system. In response to the telephone number being dialed, for example an audio call is set up from the first device 4 to the call center via the network device 3, and an activation signal is supplied to the interactive voice response system. In response to an activation of the interactive voice response system, a menu signal comprising a computer voice is supplied to the first device 4 for providing a menu to the user ("If you want A, press "1", if you want B, press "2" etc."). The user makes a selection in the menu by pressing a key of the mmi 46, which results in a selection signal being transmitted to the interactive voice response system. Then, either a next phase within the menu is started or a next menu is started or the user is connected to an employee of the call center via for example the switch 16.

This known interactive voice response system is one-sided and therefore relatively user unfriendly. To create an interactive response system that is not one-sided and that is relatively user friendly, the interactive response system 1 according to the invention is provided with the means 22 and the second device 5 is introduced.

According to the invention, a user who wants to get access to information dials a telephone number via the mmi 46 for contacting a call center comprising the interactive response system 1 etc. as described above. In addition, now, for example in parallel to the supplying of the menu signal to the first device 4, the video signal is supplied to the second device 5. The video displayed in response to a reception of the video signal may have an entertaining function to keep the user's attention and/or an explaining function to explain the procedure to the user and/or a supporting function to support the procedure to the user and/or a commercial function to draw the user's attention to further products/services.

Thereto, for example, the call processor 15 informs the controller 17 of the reception of the activation signal and/or of the transmission of the menu signal, and in response the controller 17 controls the further call processor 23, as further explained below.

Preferably, the video signal forms part of a further call different from the call. The further call comprises video destined for the user and might further comprise further audio destined for the user. The use of separate calls is advantageous in that the original call does not need to be changed and can remain as it is, and that the separate calls will get separate bills. The user might be billed for the call and the call center might be billed for the further call, or the user or the call center might be billed for both calls. In case of the video having a commercial function, a (part of a) bill might be paid by the advertiser.

The link signal might provide a direct link from the interactive response system 1 to the second device 5, such as for example an Internet Protocol address or a Uniform Resource Locator, to be entered via the first device 4. Alternatively, the link signal might provide an indirect link from the interactive response system 1 to the second device 5, such as for example a caller identification. In that case, the interactive response system 1 needs to comprise means for converting for example the caller identification into for example the Internet Protocol address or the Uniform Resource Locator. Such converting means might comprise the database 24 comprising link information received from users via mail or might comprise a server coupled to a website comprising link information entered by users via website visits. Such a server might be located inside the network 3 or might be coupled to the network 3. Instead of using the database 24, an other database situated inside the network 3 or coupled to the network 3 might be used.

In the prior art situation, the selection signal is transmitted from the first device 4 via the network device 3 to the interactive response system 1. According to the invention, the selection signal might be transmitted from the first device 4 via the network device 3 to the interactive response system 1 and/or might be transmitted from the second device 5 via the network 2 to the interactive response system 1.

In FIG. 1 the interactive response system 1 according to the invention comprises a separated part for the call and a separate part for the further call and is coupled to two devices 4 and 5. In FIG. 2 the interactive response system 1 according to the invention also comprises a separated part for the call and a separate part for the further call but is now coupled to one device 6 that comprises a separated part for the call and a separate part for the further call.

So, in FIG. 2, the interactive response system 1 according to the invention corresponds with the one shown in FIG. 1, apart from the fact that it is now coupled twice via the network 2 to the device 6. The device 6 comprises the same separate parts as the devices 4 and 5 described for FIG. 1. In this case, the device 6 for example comprises a wired or wireless telephone, or the device 6 comprises a personal computer or comprises a television coupled to a set top box. The call might be a Voice over Internet Protocol call or a Video over Internet Protocol call or an Audio Video over Internet Protocol call. The further call might be a Video over Internet Protocol call or an Audio Video over Internet Protocol call.

The interactive response system 1 according to the invention shown in FIG. 3 comprises an integrated part for the call and for the further call and is coupled to one device 6 that comprises an integrated part for the call and for the further call. This interactive response system 1 according to the invention shown in FIG. 3 comprises means 31 for receiving an activation signal via a call from a user at a customer device 6 according to the invention for in response to a reception of the activation signal activating the interactive response system 1 and comprises means 32 for in response to an activation of the interactive response system 1 transmitting a menu signal to the user for providing a menu to the user and comprises means 33 for receiving a selection signal from the user for in response to a reception of the selection signal making a selection in the menu and comprises means 34 for transmitting a video signal to the user for providing video to the user and comprises means 35 for receiving a link signal for providing a direct or indirect link from the interactive response system 1 to the customer device 6.

Thereto, the interactive response system 1 further comprises a call interface 30 coupled to a network 2 such as the internet and coupled to a call processor 36 directly as well as indirectly via the means 31-35. The call processor 36 is coupled to a controller 39 directly as well as indirectly via a switch 37 and via a database 38.

The device 6 comprises for example a wired or wireless telephone or a personal computer or a television coupled to a set top box. The call might be a Voice over Internet Protocol call or a Video over Internet Protocol call or an Audio Video over Internet Protocol call. The further call might be a Video over Internet Protocol call or an Audio Video over Internet Protocol call. The device 6 comprises means 61 for transmitting the activation signal to the interactive response system 1 via the network 2 and comprises means 62 for transmitting the link signal to the interactive response system 1 via the network 2 and comprises means 63 for transmitting the selection signal to the interactive response system 1 via the network 2 and comprises means 64 for receiving the menu signal from the interactive response system 1 via the network 2 and comprises means 65 for receiving the video signal from the interactive response system 1 via the network 2. Thereto, the device 6 comprises a call interface 60 coupled to a call processor 66 directly as well as indirectly via the means 61-65, which call processor 66 is further coupled to a man machine interface (mmi) 67 that for example comprises a display, a mouse, a keyboard, a touch screen, a remote control, a microphone and/or a loudspeaker.

In this case, the link signal might, as described before, provide a direct link to the (further call with the) device 6, such as for example an Internet Protocol address or a Uniform Resource Locator, to be entered via the device 6 via the call. Alternatively, the link signal might, as described before, provide an indirect link to the (further call with the) device 6, such as for example a caller identification. In that case, the interactive response system might need to comprise means for converting for example the caller identification into for example the Internet Protocol address or the Uniform Resource Locator. Such converting means might comprise a database comprising link information received from users via mail or might comprise a server coupled to a website comprising link information entered by users via website visits. Alternatively, the direct link might comprise for example the caller identification that directly links the interactive response system 1 and the device 6, whereby either the further call is set up in addition to the call or whereby the call is converted into the further call. In the prior art situation, the menu signal is always an audio signal, according to the invention, the menu signal might be an audio signal, a video signal and/or an audio/video signal.

For example the embodiment shown in FIG. 3 does not require the call and the further call to be separate and different calls. According to this embodiment, these calls might be separate and different calls or these calls might form part of one and the same call.

In FIG. 1-3, each coupling/connection may be a wired coupling/connection or a wireless coupling/connection. Any unit shown may be divided into sub-units, and any two or more units may be integrated into a new and larger unit. Any unit shown may comprise hardware and/or software. The computer program product according to the invention may be stored on and/or comprise a fixed medium not shown or a removable medium not shown.

The expression "for" in for example "for giving" and "for receiving" and "for transmitting" etc. does not exclude that other functions are performed as well, simultaneously or not. The expressions "X coupled to Y" and "a coupling between X and Y" and "coupling/couples X and Y" etc. do not exclude that an element Z is in between X and Y. The expressions "P comprises Q" and "P comprising Q" etc. do not exclude that an element R is comprised/included as well. The terms "a" and "an" do not exclude a possible presence of one or more pluralities.

The steps and/or functions of receiving and transmitting do not exclude further steps and/or functions, like for example, inter alia, the steps and/or functions described for the Figures etc.

The invention claimed is:

1. Interactive response system (1) for giving a user access to information by interacting with a user's first device (4) at a user location, the first device having means (41) for transmitting an activation signal to the interactive response system (1) and means for transmitting a link signal to the interactive response system (1) and by interacting with a user's second device, different than the first device, at the user location the second device including means for receiving a video signal, the interactive response system comprising:

means (11, 31) for receiving an activation signal via a call from a user for in response to a reception of the activation signal activating the interactive response system (1);

means (12, 32) for in response to an activation of the interactive response system (1) transmitting a menu signal to the user for providing a menu to the user;

means (13, 21, 33) for receiving a selection signal from the user for in response to a reception of the selection signal making a selection in the menu;

means (22, 34) for transmitting a video signal to the second device for providing video to the user, wherein the video signal forms part of a further call different from the call; and means for receiving a link signal from a user's first device for providing a direct link from the interactive response system (1) to a user's second device.

2. Interactive response system (1) as defined in claim 1, wherein the call comprises an audio call or a video call or an audio/video call and the further call comprises a video call or an audio/video call.

3. Interactive response system (1) as defined in claim 1, further comprising:

a first device (4) at a user location including means (41) for transmitting the activation signal to the interactive response system (1); and a second device (5) at the user location comprises means (51) for receiving the video signal, which first and second devices (4, 5) are different devices.

4. Interactive response system (1) as defined in claim 3, characterized in that the first device (4) comprises means (42) for transmitting a link signal to the interactive response system (1) and the interactive response system (1) comprises means (14, 35) for receiving the link signal for providing a direct link from the interactive response system (1) to the second device.

5. Interactive response system (1) as defined in claim 3, characterized in that at least one of the first and second devices (4, 5) comprises means (43, 52) for transmitting the selection signal to the interactive response system (1).

6. Interactive response system (1) as defined in claim 1, characterized in that a device (6) at a user location comprises means (61) for transmitting the activation signal to the interactive response system (1) and comprises means (64) for receiving the video signal.

7. Interactive response system (1) as defined in claim 6, characterized in that the device (6) comprises means (63) for transmitting a link signal to the interactive response system (1) and the interactive response system (1) comprises means (35) for receiving the link signal for providing a direct link from the interactive response system (1) to the device (6).

8. Interactive response system (1) as defined in claim 6, characterized in that the device (6) comprises means (65) for transmitting the selection signal to the interactive response system (1).

9. The Interactive response system (1) as defined in claim 1, wherein the direct link is an Internet Protocol address.

10. The Interactive response system (1) as defined in claim 1, wherein the direct link is a Uniform Resource Locator.

11. A method for giving a user access to information via an interactive response system comprising:
receiving an activation signal via a call from the user for activating the interactive response system;
transmitting a menu signal to the user for providing a menu to the user, the transmitting being in response to activation of the interactive response system;
receiving a selection signal from the user for making a selection in the menu;
transmitting a video signal to a second device of the user for providing video to the user, wherein the video signal forms part of a further call different from the call; and
receiving a link signal from a first device of the user for providing a direct link from the interactive response system to the second device of the user.

12. The method of claim 11, wherein the direct link is an Internet Protocol address.

13. The method of claim 11, wherein the direct link is a Uniform Resource Locator.

14. A computer program product stored in a computer readable medium for performing
a first method step of receiving an activation signal via a call from the user for activating an interactive response system;
a second method step of transmitting a menu signal to a user for providing a menu to the user, the transmitting being in response to activation of the interactive response system;
third method step of receiving a selection signal from the user for making a selection in the menu;
a fourth method step of transmitting a video signal to a user's second device for providing video to the user, wherein the video signal forms part of a further call different from the call; and
receiving a link signal from a first device of the user for providing a direct link from the interactive response system to a second device of the user.

15. The computer program product of claim 14, wherein the direct link is an Internet Protocol address.

16. The computer program product of claim 14, wherein the direct link is a Uniform Resource Locator.

17. An interactive response system for giving a user access to information by interacting with a first device of a user at a user location and by interacting with a second device of the user, different than the first device of the user, the interactive response system comprising:
a call processor;
a call interface coupled to the call processor and configured for receiving an activation signal via a call from a user for activating the interactive response system, the call interface configured for transmitting a menu signal to the user for providing a menu to the user, the call interface configured for receiving a selection signal from the user for making a selection in the menu, and the call interface configured for receiving a link signal from a first device of a user for providing a direct link from the interactive response system to a second device of a user, and the call interface configured for transmitting a video signal to the second device for providing video to the user, wherein the video signal forms part of a further call different from the call.

18. The interactive response system of claim 17, wherein the call comprises an audio call or a video call or an audio/video call and the further call comprises a video call or an audio/video call.

19. The interactive response system of claim 17, further comprising:
a first device at a user location including a call interface transmitting the activation signal to the interactive response system; and
a second device at the user location having a call interface receiving the video signal, wherein the first device and the second device are different devices.

20. The interactive response system of claim 17, wherein the first device includes a call interface for transmitting a link signal to the interactive response system and the interactive response system includes a call interface receiving the link signal for providing a direct link from the interactive response system to the second device.

21. The interactive response system of claim 19, wherein at least one of the first device and the second device includes a call interface for transmitting the selection signal to the interactive response system.

22. The interactive response system of claim 17, wherein a device at a user location includes a call interface configured for transmitting the activation signal to the interactive response system, and the call interface is configured for receiving the video signal, and wherein the device includes a call interface configured for transmitting a link signal to the interactive response system and the interactive response system includes a call interface configured for receiving the link signal for providing a direct link from the interactive response system to the device.

* * * * *